US010030665B2

(12) United States Patent
Oda et al.

(10) Patent No.: US 10,030,665 B2
(45) Date of Patent: Jul. 24, 2018

(54) LIQUID LEVEL INDICATOR, TURBO COMPRESSOR, AND TURBO REFRIGERATOR

(71) Applicant: IHI Corporation, Tokyo (JP)

(72) Inventors: Kentarou Oda, Tokyo (JP); Seiichiro Yoshinaga, Tokyo (JP); Nobuyoshi Sakuma, Tokyo (JP)

(73) Assignee: DAIKIN INDUSTRIES, LTD. (JP)

( * ) Notice: Subject to any disclaimer, the term of this patent is extended or adjusted under 35 U.S.C. 154(b) by 360 days.

(21) Appl. No.: 14/599,720

(22) Filed: Jan. 19, 2015

(65) Prior Publication Data

US 2015/0128627 A1     May 14, 2015

Related U.S. Application Data

(63) Continuation of application No. PCT/JP2013/070184, filed on Jul. 25, 2013.

(30) Foreign Application Priority Data

Aug. 13, 2012    (JP) .................................. 2012-179541

(51) Int. Cl.
    *F25B 49/00*       (2006.01)
    *F25B 43/02*       (2006.01)
    (Continued)

(52) U.S. Cl.
    CPC ......... *F04D 29/063* (2013.01); *F04D 17/122* (2013.01); *F04D 25/0606* (2013.01);
    (Continued)

(58) Field of Classification Search
    CPC .... G01N 33/00; G01N 33/2888; G01F 23/00; G01F 23/02; F25B 31/002; F25B 2500/16
    (Continued)

(56) References Cited

U.S. PATENT DOCUMENTS 4,363,240 A * 12/1982 Mizusaki ................ G01F 23/02
                                                         116/227
5,125,541 A * 6/1992 Anglehart ............ B67D 7/0222
                                                         222/158

(Continued)

FOREIGN PATENT DOCUMENTS

JP       09-126856       5/1997
JP       2010-243210     10/2010

OTHER PUBLICATIONS

International Search Report and Written Opinion dated Aug. 20, 2013 in corresponding PCT International Application No. PCT/JP2013/070184.

*Primary Examiner* — Ned Landrum
*Assistant Examiner* — Daniel C Comings
(74) *Attorney, Agent, or Firm* — Ostrolenk Faber LLP

(57) ABSTRACT

A liquid level indicator including a liquid level calm portion that is provided with a liquid introduction inlet that communicates with a portion below the liquid level in an oil tank and a gas vent that communicates with a portion above the liquid level; and a sight glass for observing a liquid level in the liquid level calm portion, having a liquid introduction tube provided with an extension portion that communicates with the liquid introduction inlet and extends toward the bottom portion of the oil tank, and a distal end portion that communicates with the extension portion and opens in a direction other than the downward direction below the liquid level.

21 Claims, 4 Drawing Sheets

(51) Int. Cl.
*F25B 41/00* (2006.01)
*F25B 31/00* (2006.01)
*F04D 29/063* (2006.01)
*G01F 23/02* (2006.01)
*F04D 17/12* (2006.01)
*F04D 25/06* (2006.01)
*F25B 1/00* (2006.01)
*F25B 1/053* (2006.01)
*F25B 9/00* (2006.01)
*G01F 23/00* (2006.01)

(52) U.S. Cl.
CPC .............. *F25B 1/005* (2013.01); *F25B 1/053* (2013.01); *F25B 9/002* (2013.01); *G01F 23/02* (2013.01); *F25B 31/002* (2013.01); *F25B 2339/024* (2013.01); *F25B 2339/047* (2013.01); *F25B 2400/13* (2013.01); *F25B 2500/16* (2013.01); *F25B 2700/03* (2013.01); *G01F 23/00* (2013.01)

(58) Field of Classification Search
USPC .................. 62/84, 125, 193, 194, 468, 469; 73/209 R, 323, 325
See application file for complete search history.

(56) References Cited

U.S. PATENT DOCUMENTS 5,557,944 A * 9/1996 Hirano ................. F25B 31/002
  252/68
7,669,472 B2 * 3/2010 Tanaka ................ G01F 23/2927
  73/290 R

* cited by examiner

LIQUID LEVEL INDICATOR, TURBO COMPRESSOR, AND TURBO REFRIGERATOR This application is a Continuation of International Application No. PCT/JP2013/070184, filed on Jul. 25, 2013, claiming priority based on Japanese Patent Application No. 2012-179541, filed Aug. 13, 2012, the contents of both International Application and the Japanese Application are incorporated herein by reference in their entity.

TECHNICAL FIELD

The present invention relates to a liquid level indicator, a turbo compressor, and a turbo refrigerator.

BACKGROUND ART

As a refrigerator, there is known a turbo refrigerator that is provided with a turbo compressor that rotates an impellor with an electric motor to compress and discharge a refrigerant. In the turbo compressor, a lubricating oil is supplied from an oil tank to the sliding portions such as the bearings of the rotating shaft of the electric motor and the bearings of the rotating shaft of the impeller. At the regions where the lubricating oil is supplied in this way, there is a possibility of oil leaking from the seal portions that seal the periphery of the rotating shaft to another space.

Conventionally, a liquid level indicator having a sight glass for observing the liquid level height in an oil tank is provided in order to confirm the occurrence of this oil leakage. The following Patent Document 1 discloses a differential pressure-type liquid level gauge as one device for liquid-level height observation. This differential pressure-type liquid level gauge has a constitution that is suited to a tank for liquefied gas, with the distal end portion, which includes an opening end, of the high-pressure side connecting tube being inserted in a horizontal manner or nearly horizontal manner into the interior portion of the tank for liquefied gas in the vicinity of the bottom portion.

PRIOR ART DOCUMENTS

Patent Documents

[Patent Document 1] Japanese Unexamined Patent Application, First Publication No. 2010-243210

DISCLOSURE OF THE INVENTION

Problems to be Solved by the Invention

The storage amount of the liquid in an oil tank of a turbo compressor is small compared to the tank for liquefied gas, and in the aforementioned differential pressure-type liquid level gauge, it is difficult to observe minute changes in the liquid level due to oil leakage. For example, in the case of the oil tank being arranged below the gear unit, and oil showering down from the gear unit to the liquid level, the liquid level is disturbed in short time intervals, and in the case of the disturbance of the liquid level being great, the measuring range of the liquid level gauge is exceeded, which makes observation difficult. Moreover, since there is foaming in the oil tank during startup of the turbo compressor and the like, in the case of air bubbles with high viscosity that are difficult to burst flowing into the introduction tube, there is a possibility of the liquid level not being accurately shown in the liquid level gauge.

The present invention was achieved in view of the above circumstances, and has as its object to provide a liquid level indicator, a turbo compressor, and a turbo refrigerator that can accurately display the liquid level of a liquid storage portion.

Means for Solving the Problems

The first aspect of the present invention is a liquid level indicator that is provided with a liquid level calm portion that is provided with a liquid introduction inlet that communicates with a portion below the liquid level in a liquid storage portion and a gas vent that communicates with a portion above the liquid level; and a sight glass for observing the liquid level in the liquid level calm portion, having a liquid introduction tube provided with an extension portion that communicates with the liquid introduction inlet and extends toward the bottom portion of the liquid storage portion, and a distal end portion that communicates with the extension portion and opens in a direction other than the downward direction below the liquid level.

In the first aspect of the present invention, since the liquid introduction tube extends toward the bottom portion of the liquid storage portion where the influence of short-time period turbulence at the liquid level is minimal, it is possible to prevent the measuring range being exceeded in observation through the sight glass. Also, since the liquid level that is visible from the sight glass is insensitive to short-time period turbulence, it is possible to display the time-average liquid level. Also, since the distal end portion of the liquid introduction tube opens in a direction other than the downward direction below the liquid level, it is possible to prevent air bubbles in the liquid from entering the tube interior. Note that a "downward direction" here includes directly downward and obliquely downward, while "a direction other than the downward direction" includes directly sideways, directly upward, and obliquely upward.

In the second aspect of the present invention, the liquid introduction tube of the first aspect may be provided with the distal end portion that opens in an upward direction below the liquid level.

In the second aspect of the present invention, since the distal end portion of the liquid introduction tube opens in an upward direction below the liquid level, it is possible to reliably prevent air bubbles in the liquid from entering the tube interior. Note that an "upward direction" here includes directly upward and obliquely upward.

In the third aspect of the present invention, the liquid introduction tube of the first and second aspects may have a sloping portion for guiding air bubbles introduced into the tube interior to the liquid level calm portion by their buoyancy.

In the third aspect of the present invention, even assuming air bubbles enter the tube interior of the liquid introduction tube, by guiding the air bubbles to the liquid level calm portion with a slope, it is possible to prevent the air bubbles from clogging up the tube interior.

In the fourth aspect of the present invention, the distal end portion of any of the first to third embodiments may be provided bent with respect to the extension portion toward the inner wall side of the liquid storage portion.

In the fourth aspect of the present invention, since there is less generation of air bubbles at the inner wall side of the oil tank than at the center of the oil tank, by bending the distal end portion of the liquid introduction tube toward the inner wall side, it is possible to prevent air bubbles in the liquid from entering the tube interior.

In the fifth aspect of the present invention, any of the first to fourth aspects may have a gas vent tube provided with a second extension portion that communicates with the gas vent and extends toward the top portion of the liquid storage portion, and a second distal end portion that communicates with the second extension portion and opens in a direction other than the upward direction above the liquid level.

In the fifth aspect of the present invention, since the gas vent tube extends toward the top portion of the liquid storage portion, even in the case of turbulence of the liquid level in the oil storage portion being great, by preventing the introduction of a liquid from the gas vent, it is possible to keep the liquid level being observed calm. Also, since the distal end portion of the gas vent tube is opened in a direction other than the upward direction above the liquid level, even in the case of a liquid showering down from above, it is possible to prevent the liquid from entering the tube interior.

Note that an "upward direction" here includes directly upward and obliquely upward, while "a direction other than the upward direction" includes directly sideways, directly downward and obliquely downward.

In the sixth aspect of the present invention, the gas vent tube in the fifth aspect may have the second distal end portion that opens in a downward direction above the liquid level.

In the sixth aspect of the present invention, since the distal end portion of the gas vent tube opens in a downward direction above the liquid level, even in the case of a liquid showering down from above, it is possible to reliably prevent the liquid from entering the tube interior. Note that a "downward direction" here includes directly downward and obliquely downward.

In the seventh aspect of the present invention, the second distal end portion in the fifth or sixth aspect may be provided bent with respect to the second extension portion toward the inner wall side of the liquid storage portion.

In the seventh aspect of the present invention, since there is less of a liquid showering down from above at the inner wall side of the oil tank than at the center of the oil tank, by bending the second distal end portion of the gas vent tube toward the inner wall side, it is possible to prevent the liquid that is showering down from above from entering the tube interior.

The eighth aspect of the present invention is a turbo compressor that compresses a gas by rotating an impeller with an electric motor, having a gear unit that transmits the rotating force of the electric motor to the impeller; and an oil tank below the gear unit that stores lubricating oil to be supplied to the gear unit, and which may be provided with the liquid level indicator according to any of the first to seventh aspects as a liquid level indicator that displays the liquid level of the oil tank.

The ninth aspect of the present invention is a turbo refrigerator that has a condenser that liquefies a compressed refrigerant; an evaporator that by evaporating the refrigerant that has been liquefied by the condenser cools a cooling object; and a turbo compressor that compresses the refrigerant that has been evaporated by the evaporator and supplies it to the condenser, and that may have the turbo compressor according to the eighth aspect as the turbo compressor.

Effects of the Invention

According to the prevent invention, a liquid level indicator that can accurately display the liquid level of the liquid storage portion, a turbo compressor, and a turbo refrigerator are obtained.

EMBODIMENTS FOR CARRYING OUT THE INVENTION

Figure 1:
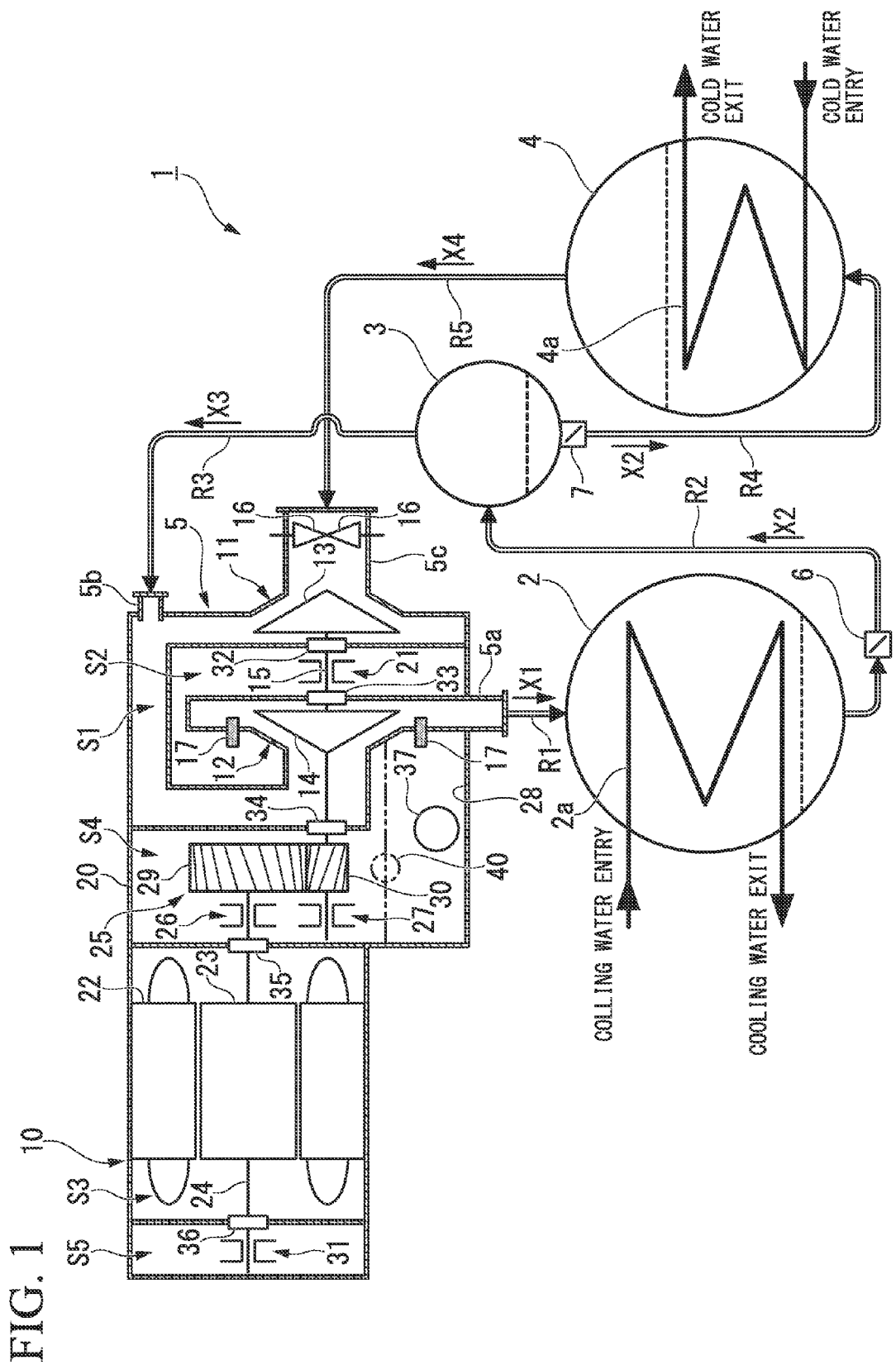
FIG. 1 is a system diagram of the turbo refrigerator in the first embodiment of the present invention.

Hereinbelow, embodiments of the present invention shall be described referring to the drawings.

(First Embodiment)

FIG. 1 is a system diagram of a turbo refrigerator 1 in the first embodiment of the present invention.

The turbo refrigerator 1 of the present embodiment makes cold water for air conditioning the object to be cooled, with for example Freon serving as the refrigerant. As shown in FIG. 1, the turbo refrigerator 1 is provided with a condenser 2, an economizer 3, an evaporator 4, and a turbo compressor 5.

The condenser 2 is connected with a gas discharge tube 5a of the turbo compressor 5 via a flow passage R1. The refrigerant that is compressed by the turbo compressor 5 (the compressed refrigerant gas X1) is supplied to the condenser 2 through the flow passage R1. The condenser 2 liquefies this compressed refrigerant gas X1. The condenser 2 is provided with a heat transfer tube 2a through which cooling water flows, and cools the compressed refrigerant gas X1 by heat exchange between the compressed refrigerant gas X1 and the cooling water.

The compressed refrigerant gas X1 is cooled by the heat exchange with the cooling water, liquefies to become a refrigerant liquid X2, and collects at the bottom of the condenser 2. The bottom of the condenser 2 is connected with an economizer 3 via the flow passage R2. An expansion valve 6 for decompressing the refrigerant liquid X2 is provided in the flow passage R2. The refrigerant liquid X2 that is decompressed by the expansion valve 6 is supplied to the economizer 3 through the flow passage R2. The economizer 3 stores the decompressed refrigerant liquid X2 temporarily, and separates the refrigerant into a liquid phase and a gas phase.

The top portion of the economizer 3 is connected with an economizer connecting tube 5b of the turbo compressor 5 via a flow passage R3. The gas phase component X3 of the refrigerant separated by the economizer 3 is supplied through the flow passage R3 to a second compression stage 12 in the turbo compressor 5 without passing through the evaporator 4 and the first compression stage 11, and enhances efficiency. On the other hand, the bottom portion of the economizer 3 is connected with the evaporator 4 via a flow passage R4. An expansion valve 7 for further decompressing the refrigerant liquid X2 is provided in the flow passage R4.

The refrigerant liquid X2 that has been decompressed further by the expansion valve 7 is supplied to the evaporator 4 through the flow passage R4. By evaporating the refrigerant liquid X2, the evaporator 4 cools cold water with the evaporation heat. The evaporator 4 is provided with a heat-transfer tube 4a through which the cold water flows, and cools the cold water and evaporates the refrigerant liquid X2 by the heat exchange between the refrigerant liquid X2 and the cold water. By the heat exchange with the cold water, the refrigerant liquid X2 draws heat, evaporates, and becomes refrigerant gas X4.

The top portion of the evaporator 4 is connected with a gas induction tube 5c of the turbo compressor 5 via a flow passage R5. The refrigerant gas X4 which evaporated in the evaporator 4 is supplied to the turbo compressor 5 through the flow passage R5. The turbo compressor 5 compresses the refrigerant gas X4 which has evaporated, and supplies it to the condenser 2 as compressed refrigerant gas X1. The turbo compressor 5 is a two-stage compressor that is provided with a first compression stage 11 that compresses the refrigerant gas X4, and the second compression stage 12 that further compresses the refrigerant that was subjected to one stage of compression.

An impeller 13 is provided in the first compression stage 11, an impeller 14 is provided in the second compression stage 12, and they are connected by a rotation shaft 15. The turbo compressor 5 compresses the refrigerant by rotating the impellers 13 and 14 with an electric motor 10. The impellers 13 and 14 are radial impellers and have blades with three-dimensional torsion, not illustrated, that discharge the refrigerant taken in the axial direction in the radial direction.

An inlet guide vane 16 for adjusting the suction quantity of the first compression stage 11 is provided in the gas induction tube 5c. The inlet guide vane 16 is made rotatable so that the apparent area from the flow direction of the refrigerant gas X4 can be changed. A diffuser flow passage is provided around each of the impellers 13 and 14, and the refrigerant that is ejected in the radial direction is compressed and raised in pressure in the diffuser flow passage. Moreover, it is possible to supply it to the next compression stage by a scroll flow passage that is provided around the impellers 13 and 14. An outlet throttle valve 17 is provided around the impeller 14, whereby it is possible to control the discharge amount from the gas discharge tube 5a.

The turbo compressor 5 is equipped with an enclosed-type housing 20. The housing 20 is divided into a compression flow passage space S1, a first bearing accommodation space S2, a motor accommodation space S3, a gear unit accommodation space S4, and a second bearing accommodation space S5. The impellers 13 and 14 are provided in the compression flow passage space S1. The rotation shaft 15 which connects the impellers 13 and 14 is provided inserted in the compression flow passage space S1, the first bearing accommodation space S2, and the gear unit accommodation space S4. A bearing 21 that supports the rotation shaft 15 is provided in the first bearing accommodation space S2.

A stator 22, a rotor 23, and a rotation shaft 24 connected to the rotor 23 are provided in the motor accommodation space S3. This rotation shaft 24 is provided inserted in the motor accommodation space S3, the gear unit accommodation space S4, and the second bearing accommodation space S5. A bearing 31 that supports the anti-load side of the rotation shaft 24 is provided in the second bearing accommodation space S5. A gear unit 25, bearings 26 and 27, and an oil tank (liquid storage portion) 28 are provided in the gear unit accommodation space S4.

A gear unit 25 has a large diameter gear 29 fixed to the rotation shaft 24, and a small diameter gear 30 that is fixed to the rotation shaft 15 and meshes with the large diameter gear 29. The gear unit 25 transmits rotating force so that the rotation frequency of the rotation shaft 15 may increase (become faster) with respect to the rotation frequency of the rotation shaft 24. The bearing 26 supports the rotation shaft 24. The bearing 27 supports the rotation shaft 15. The oil tank 28 is provided below the gear unit 25, and stores the lubricating oil supplied to each sliding part of the bearings 21, 26, and 27 and 31 and the like. Note that the reference numeral 37 denotes an oil pump that supplies the lubricating oil to each sliding part.

In this kind of housing 20, seal portions 32 and 33 that seal the periphery of the rotation shaft 15 are provided between the compression flow passage space S1 and the first bearing accommodation space S2. Moreover, in the housing 20, a seal portion 34 that seals the periphery of the rotation shaft 15 is provided between the compression flow passage space S1 and the gear unit accommodation space S4. Also, in the housing 20, a seal portion 35 that seals the periphery of the rotation shaft 24 is provided between the gear unit accommodation space S4 and the motor accommodation space S3. Also, in the housing 20, a seal portion 36 that seals the periphery of the rotation shaft 24 is provided between the motor accommodation space S3 and the second bearing accommodation space S5.

Incidentally, in the gear unit accommodation space S4, the lubricating oil is scraped up particularly by the large diameter gear 29 of the gear unit 25 that transmits rotating force to the impellers 13 and 14, and mist-state oil droplets and soot are generated. Also, since the seal at the sliding portions of the rotation shafts 15 and 24 is not perfect, if lubricating oil begins to leak out to another space due to a pressure differential between spaces and the like, so-called oil loss may arise in which the liquid level of the oil tank 28 falls. For this reason, a liquid level indicator 40 for observing the liquid level height is provided in the oil tank 28.

Figure 2:
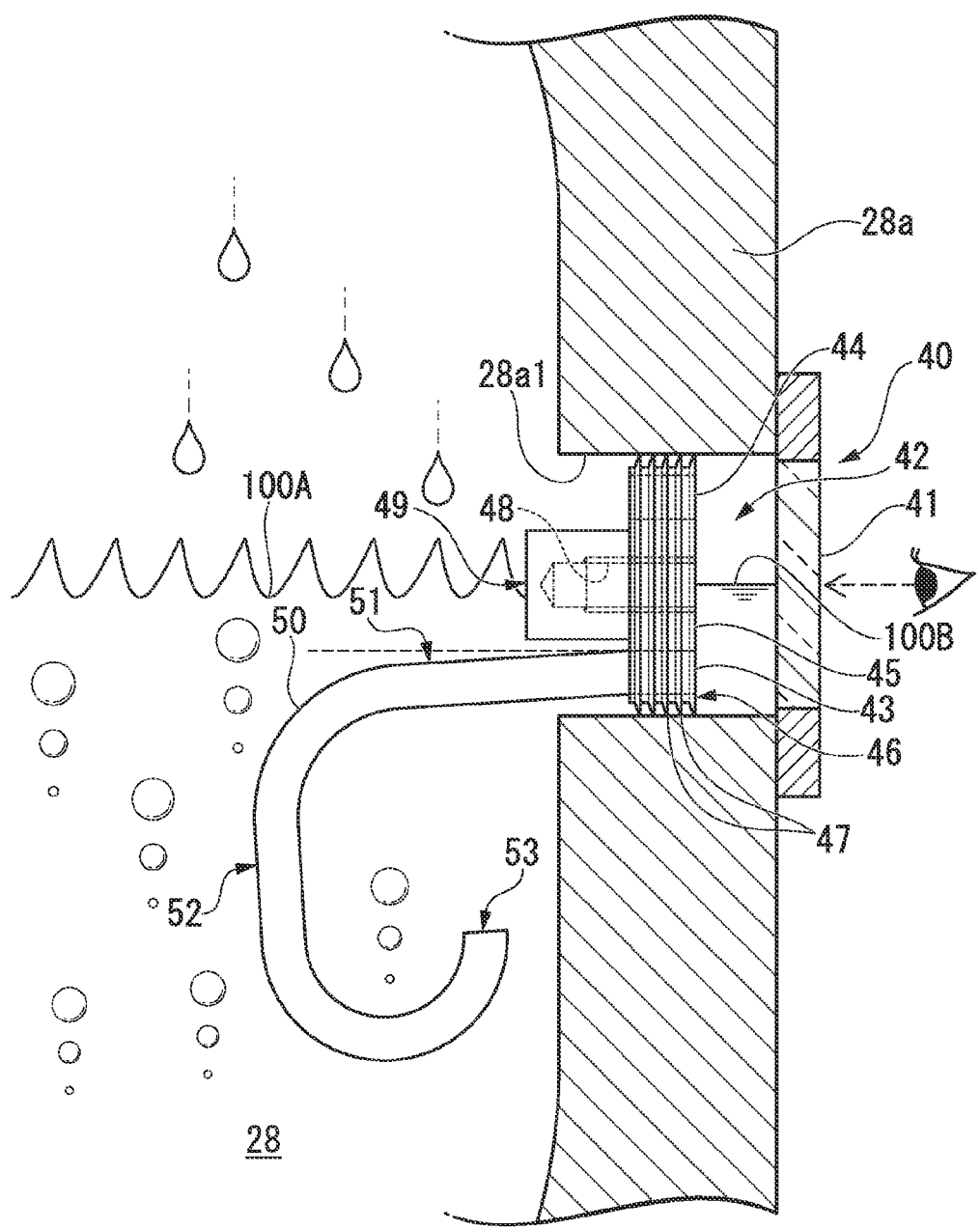
FIG. 2 is a configuration diagram of the liquid level indicator in the first embodiment of the present invention.
Figure 3:
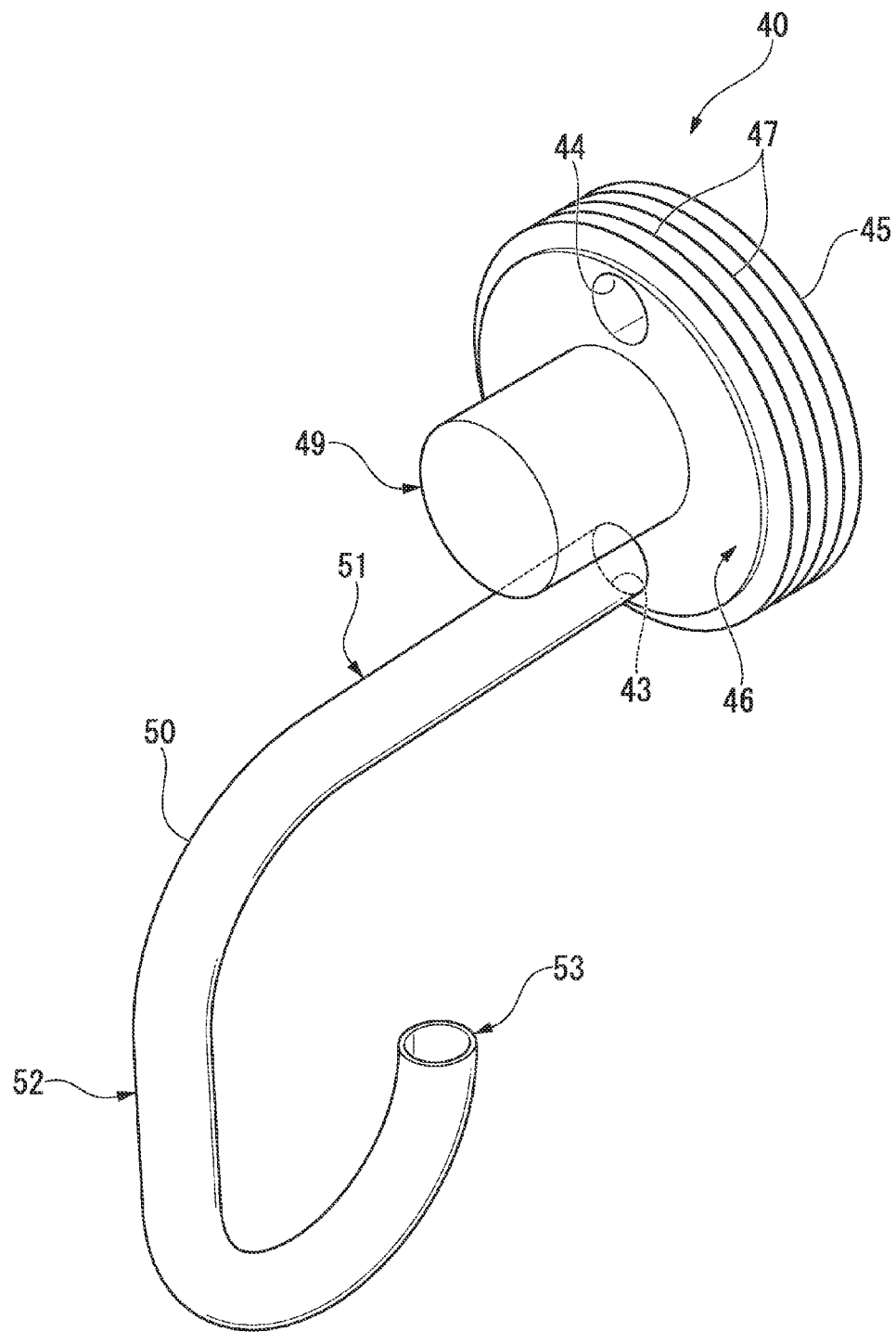
FIG. 3 is a perspective diagram that shows the essential portions of the liquid level indicator in the first embodiment of the present invention.

Hereinbelow, the constitution of this liquid level indicator 40 shall be described with reference to FIGS. 2 and 3. FIG. 2 is a configuration diagram of the liquid level indicator 40 in the first embodiment of the present invention. FIG. 3 is a perspective diagram that shows the essential portions of the liquid level indicator 40 in the first embodiment of the present invention.

As shown in FIG. 2, the liquid level indicator 40 has a sight glass 41 provided in a wall portion 28a of the oil tank 28. A through opening 28a1 that penetrates horizontally in the thickness direction is formed in the wall portion 28a of the oil tank 28. The sight glass 41 is attached to the outer wall side of the wall portion 28a with screws not illustrated, and closes off the through opening 28a1. A predetermined liquid level range with a scale not illustrated is provided in the sight glass 41.

The liquid level indicator 40 has a liquid level calm portion 42. The liquid level calm portion 42 has a liquid introduction inlet 43 that communicates with a portion below a liquid level 100A in the oil tank 28, and a gas vent 44 communicating with a portion above the liquid level 100A. By forming a calm liquid level 100B for observation by eliminating the effects of the liquid level 100A in the oil tank 28, the liquid level calm portion 42 facilitates observation of the liquid level height via the sight glass 41. The liquid level calm portion 42 of this embodiment is formed by fitting a plug member 45 in the through opening 28a1.

As shown in FIG. 3, the plug member 45 has a cylindrical flange portion 46. A plurality of seal fins 47 are provided on the outer periphery of the flange portion 46. As shown in FIG. 2, pressing the seal fins 47 into the inner surface of the through opening 28a1, the seal fins 47 seal the gap between the flange portion 46 and the through opening 28a1. A projection 49 in which a thread 48 is cut is provided in the center of the flange portion 46. By screw joining a bolt or the like corresponding to this thread 48, it is possible to easily perform attachment/removal of the plug member 45.

The liquid introduction inlet 43 and the gas vent 44 that are symmetrically arranged sandwiching the projection 49 are provided in the flange portion 46. The liquid introduction inlet 43 is arranged perpendicularly below the projection 49, and is provided penetrating the flange portion 46 horizontally in the thickness direction. The gas vent 44 is arranged perpendicularly above the projection 49, and is provided penetrating the flange portion 46 horizontally in the thickness direction.

The liquid level indicator 40 has a liquid introduction tube 50. The liquid introduction tube 50 communicates with the liquid introduction inlet 43. One end of the liquid introduction tube 50 of the present embodiment is fitted into the liquid introduction inlet 43, and by caulking the one end that has been fitted, it can be integrally attached to the plug member 45. As shown in FIG. 2, this liquid introduction tube 50 has a sloping portion 51, an extension portion 52, and a distal end portion 53.

The sloping portion 51 is a portion that extends approximately horizontally from the liquid introduction inlet 43 toward the center of the oil tank 28. The sloping portion 51 slopes downward only a few degrees with respect to the horizontal plane extending from the liquid introduction inlet 43 (indicated by the dotted line in FIG. 2). Even in the case of air bubbles being introduced to the inside of the liquid introduction tube 50, this sloping portion 51, by guiding the air bubbles to the liquid level calm portion 42 by their buoyancy, prevents the air bubbles from clogging up the liquid introduction tube 50 and thereby inhibiting the flow of a liquid.

The extension portion 52 is a portion that communicates with the sloping portion 51 and extends toward the bottom of the oil tank 28. The extension portion 52 extends by a predetermined distance perpendicularly downward from the lower end of the sloping portion 51. The extension portion 52 extends vertically downward to a depth at which liquid flows due to the influence of short-time period turbulence of the liquid level 100A in the oil tank 28 is minimal. This extension portion 52, by introducing liquid more toward the bottom of the oil tank 28 that is insensitive to short-time period turbulence of the liquid level 100A, forms the calm liquid level 100B in the liquid level calm portion 42.

The distal end portion 53 is a portion that communicates with the extension portion 52, and that opens in a direction other than downward below the liquid level 100, being upward in the present embodiment. This distal end portion 53 opens perpendicularly upward under the liquid level 100A. By opening upward under the liquid level 100A, the distal end portion 53 prevents air bubbles in the liquid from entering the tube interior. Also, the distal end portion 53 is provided bent with respect to the extension portion 52 from the lower end of the extension portion 52 toward the inner wall side of the oil tank 28. In this way, the distal end portion 53 is arranged on the opposite side of the center of the oil tank 28 where air bubbles are generated.

Next, the action of the liquid level indicator 40 of the aforementioned constitution shall be described.

As shown in FIG. 1, when the turbo compressor 5 is driven, the refrigerant gas X4 of the evaporator 4 is suctioned in by the impellers 13 and 14, compressed to become the compressed refrigerant gas X1, and guided to the condenser 2. The refrigerating cycle is repeated by this refrigerant being circulated in the order of the condenser 2, the evaporator 4, and the turbo compressor 5. This turbo compressor 5 has the gear unit 25 for transmitting the rotating force of the electric motor 10 to the impellers 13 and 14. The oil tank 28 that stores lubricating oil that is supplied to the gear unit 25 is provided below the gear unit 25.

Since the gear unit 25 generates heat at a high temperature, a lot of the lubricating oil is supplied, and the lubricating oil is showered on the oil tank 28 from above. For this reason, the liquid level 100A in the oil tank 28 is extremely turbulent in a short-time period as shown in FIG. 2. The liquid level indicator 40 for checking when oil leakage has occurred at the timing of driving of the turbo compressor 5 is provided in this oil tank 28. This liquid level indicator 40 has the liquid introduction tube 50 that is equipped with the extension portion 52 that communicates with the liquid introduction inlet 43 and that extends toward the bottom portion of the oil tank 28, and the distal end portion 53 that communicates with the extension portion 52 and which opens upward under the liquid level 100A.

Since this liquid introduction tube 50 extends toward the bottom portion of the oil tank 28, it is possible to introduce from the distal end portion 53 a liquid hardly affected by short-time period turbulence at the liquid level 100A, and guide it to the liquid level calm portion 42. For this reason, even if the liquid level 100A is extremely turbulent in a short-time period, it is possible to prevent the measuring range being exceeded in observation via the sight glass 41. Also, since there is a pressure loss via the piping in the liquid introduction tube 50, the liquid level 100B that is seen from the sight glass 41 is insensitive to short-time period turbulence, and so it is possible to display a time average liquid level.

Also, the distal end portion 53 of this liquid introduction tube 50 opened upward below the liquid level 100A. During operation of the turbo compressor 5, the interior of the oil tank 28 foams, and air bubbles with a comparatively high viscosity that are difficult to burst are generated. These air bubbles, when they enter the liquid introduction tube 50 and collect in the tube interior, impede the flow of the liquid in the tube interior. But by the distal end portion 53 of the liquid introduction tube 50 opening upward under the liquid level 100A as shown in FIG. 2, it is possible to prevent the air bubbles in the liquid from entering the tube interior.

Also, since there is less generation of air bubbles at the inner wall side of the oil tank 28 than at the center of the oil tank 28, by bending the distal end portion 53 of the liquid introduction tube 50 toward the inner wall side of the oil tank 28 in the present embodiment, it is possible to more reliably prevent air bubbles in the liquid from entering the tube interior.

Also, the liquid introduction tube 50 has the sloping portion 51 for guiding air bubbles introduced to the tube interior to the liquid level calm portion 42 by their buoyancy. For that reason, even in the event of air bubbles entering the tube interior of the liquid introduction tube 50, by guiding the air bubbles to the liquid level calm portion 42 with the incline, it is possible to prevent the air bubbles from clogging the tube interior.

Accordingly, the present embodiment given above discloses the liquid level indicator 40 having a liquid level calm portion 42 that is provided with the liquid introduction inlet 43 that communicates with a portion below the liquid level 100A in the oil tank 28 and a gas vent 44 that communicates with a portion above the liquid level 100A, and a sight glass 41 for observing the liquid level 100B in the liquid level calm portion 42. By having the liquid introduction tube 50 that is provided with the extension portion 52 that communicates with the liquid introduction inlet 43 and extends toward the bottom portion of the oil tank 28, and the distal end portion 53 that communicates with the extension portion 52 and opens in a direction other than downward below the liquid level 100A, the liquid level indicator 40 accurately displays the liquid level height of the oil tank 28, whereby it is possible to observe oil leakages and the like of the oil tank 28.

(Second Embodiment)

Next, the second embodiment of the present invention shall be described. In the explanation below, the same reference numerals shall be given to those portions having the same or similar constitution as the first embodiment, with descriptions thereof being simplified or omitted.

Figure 4:
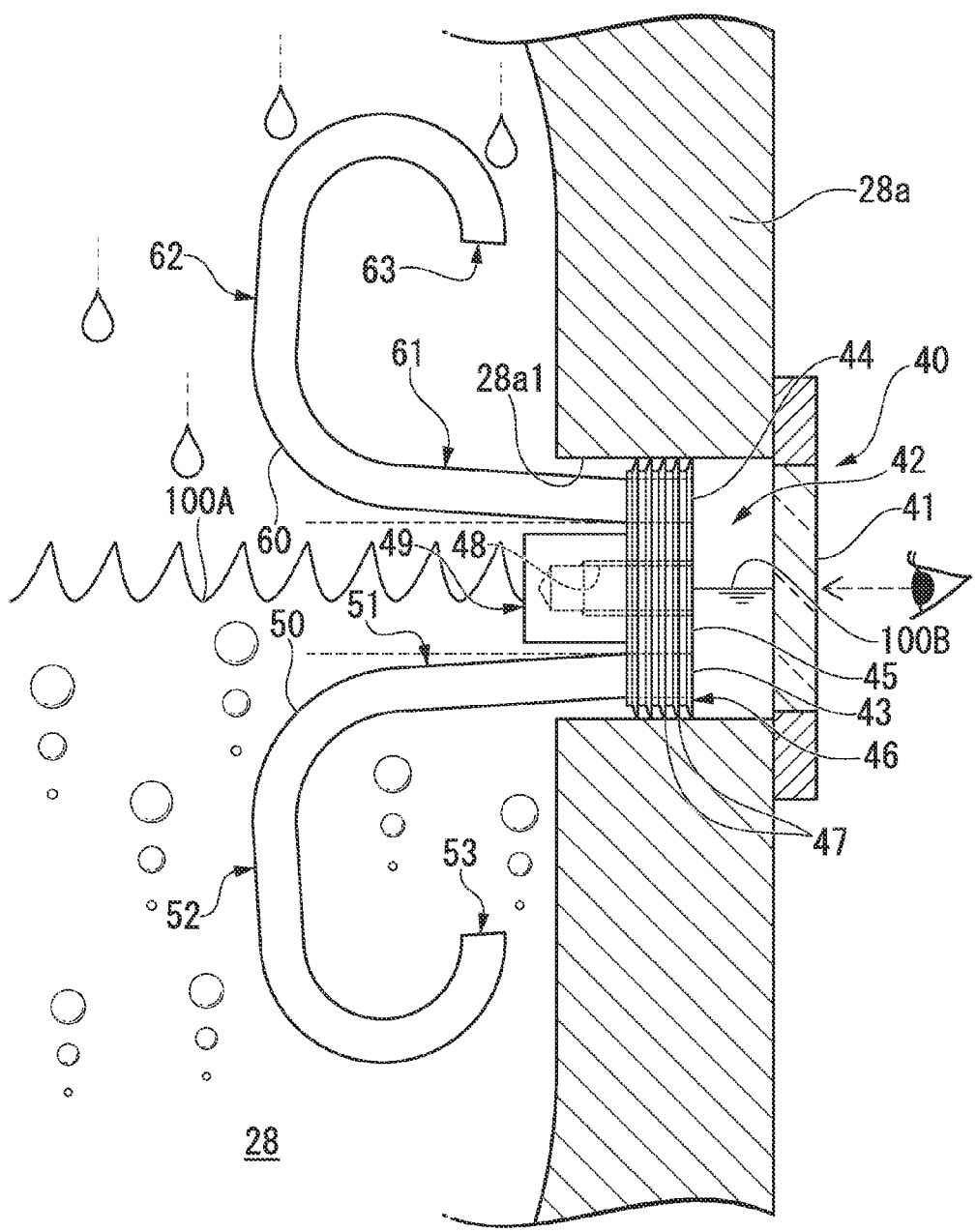
FIG. 4 is a configuration diagram of the liquid level indicator in the second embodiment of the present invention.

FIG. 4 is a configuration diagram of the liquid level indicator 40 in the second embodiment.

As shown in FIG. 4, the second embodiment differs from the aforementioned embodiment on the point of the liquid level indicator 40 having a gas vent tube 60.

One end of the gas vent tube 60 is fitted in the gas vent 44, and by caulking that fitted one end, it is integrally attached to the plug member 45. This gas vent tube 60 has, as shown in FIG. 4, a sloping portion 61, an extension portion (second extension portion) 62, and a distal end portion (second distal end portion) 63. The sloping portion 61 is a portion that extends approximately horizontally from the gas vent 44 toward the center of the oil tank 28. The sloping portion 61 slopes upward only a few degrees with respect to the horizontal plane extending from the gas vent 44 (indicated by the dotted line in FIG. 4).

The extension portion 62 is a portion that communicates with the sloping portion 61 and extends toward the top of the oil tank 28. The extension portion 62 extends by a predetermined distance perpendicularly upward from the upper end of the sloping portion 61.

The distal end portion 63 is a portion that communicates with the extension portion 62, and that opens in a direction other than upward above the liquid level 100, being downward in the present embodiment. This distal end portion 63 opens perpendicularly downward above the liquid level 100A. Also, the distal end portion 63 is provided bent with respect to the extension portion 62 from the upper end of the extension portion 62 toward the inner wall side of the oil tank 28.

According to the second embodiment, since the gas vent 60 extends toward the top portion of the oil tank 28, even in the case of turbulence of the liquid level 100A being great in the oil tank 28, it is possible to prevent the introduction of a liquid from the gas vent 44, and so it is possible to keep the liquid level 100B being observed calm. Also, since the distal end portion 63 of the gas vent 60 is opened downward above the liquid level 100A, even in the case of a liquid showering down from above, it is possible to prevent the liquid from entering the tube interior.

Also, since there is less showering down of a liquid from above at the inner wall side of the oil tank 28 than the center of the oil tank 28, by bending the second distal end portion 63 of the gas vent 60 toward the inner wall side of the oil tank 28, it is possible to prevent the liquid that is showering down from above from entering the tube interior. Also, the gas vent tube 60 has the sloping portion 61, and so even in the event of a liquid being introduced into the gas vent tube 60, it is possible to guide the liquid to the liquid level calm portion 42 by its own weight. For that reason, it is possible to prevent the liquid from clogging the gas vent tube 60 and thereby inhibiting the flow of gas.

In this way, according to the second embodiment of the constitution given above, even if the liquid level 100A undergoes extremely intense turbulence in a short time period, it is possible to accurately display the liquid level height of the oil tank 28.

Hereinabove, the preferred embodiments of the present invention were described while referring to the drawings, but the present invention is not limited to the aforementioned embodiments. The various shapes and combinations of each composite member shown in the embodiments described above refer to only a single example, and various modifications are possible based on design requirements and so forth within a scope that does not deviate from the subject matter of the present invention.

For example, in the embodiments given above, the liquid introduction tube is a tube member with nothing arranged in its interior, but a cutter for cutting (severing) air bubbles into small pieces within the interior may be provided for example in a cross shape at the distal end portion, so that even if air bubbles enter the interior they do not clog up the liquid introduction tube.

Also, for example, the embodiment given above illustrated a form in which the distal end portion of the liquid introduction tube opened facing straight up, but the present invention is not limited to this form, and the distal end portion of the liquid introduction tube may also have a form that opens obliquely upward or directly sideways.

In addition, for example, the embodiment given above illustrated a form in which the second distal end portion of the gas vent tube opened facing straight down, but the present invention is not limited to this form, and the second distal end portion of the gas vent tube may also have a form that opens obliquely downward or directly sideways.

Also, in the embodiment given above, a form was illustrated that applied the liquid level indicator to an oil tank, but the present embodiment is not limited to this form and may also be applied to another liquid storage portion. For example, the present invention can be applied to a tank for liquefied gas, and can be more favorably applied to a tank of a liquid circulation system in which the liquid circulates and the total amount of the liquid does not fluctuate.

INDUSTRIAL APPLICABILITY

The liquid level indicator, and a turbo refrigerator provided with a turbo compressor provided with the liquid level indicator can accurately display the liquid level in a liquid storage portion.

DESCRIPTION OF THE REFERENCE SYMBOLS

1: Turbo refrigerator
2: Condenser
4: Evaporator
5: Turbo compressor
10: Electric motor
13, 14: Impeller
25: Gear unit
28: Oil tank (liquid storage portion)
40: Liquid level indicator
41: Sight glass
42: Liquid level calm portion
43: Liquid introduction inlet 44: Gas vent
50: Liquid introduction tube
51: Sloping portion
52: Extension portion
53: Distal end portion
60: Gas vent tube
62: Extension portion (second extension portion)
63: Distal end portion (second distal end portion)
100A: Liquid level
100B: Liquid level

The invention claimed is:

1. A liquid level indicator comprising:
a liquid level calm portion that is provided with a liquid introduction inlet that communicates with a portion below a liquid level in a liquid storage portion and a gas vent that communicates with a portion above the liquid level; and
a sight glass for observing the liquid level in the liquid level calm portion,
wherein the liquid level calm portion is provided in a wall portion inside of the liquid storage portion,
the liquid level calm portion has a plug member that is provided with the liquid introduction inlet and the gas vent, and
the liquid level indicator comprises a liquid introduction tube provided with an extension portion that communicates with the liquid introduction inlet and extends in the liquid storage portion toward a bottom portion of the liquid storage portion and is separated from the bottom portion of the liquid storage portion, and a distal end portion that communicates with the extension portion, opens below the liquid level and face to a direction other than the downward direction.

2. The liquid level indicator according to claim 1, wherein the liquid introduction tube is provided with the distal end portion that opens in an upward direction below the liquid level.

3. The liquid level indicator according to claim 1, wherein the liquid introduction tube has a sloping portion for guiding air bubbles introduced to the tube interior to the liquid level calm portion by their buoyancy.

4. The liquid level indicator according to claim 1, wherein the distal end portion is provided bent with respect to the extension portion toward the inner wall side of the liquid storage portion.

5. The liquid level indicator according to claim 1, having a gas vent tube provided with a second extension portion that communicates with the gas vent and extends toward the top portion of the liquid storage portion, and a second distal end portion that communicates with the second extension portion and opens in a direction other than the upward direction above the liquid level.

6. The liquid level indicator according to claim 5, wherein the gas vent tube is provided with the second distal end portion that opens in a downward direction above the liquid level.

7. The liquid level indicator according to claim 5, wherein the second distal end portion is provided bent with respect to the second extension portion toward the inner wall side of the liquid storage portion.

8. A turbo compressor that compresses a gas by rotating an impeller with an electric motor, comprising:
a gear unit that transmits the rotating force of the electric motor to the impeller; and
an oil tank below the gear unit that stores lubricating oil to be supplied to the gear unit,
wherein the turbo compressor is provided with the liquid level indicator according to claim 1 as a liquid level indicator that displays the liquid level of the oil tank.

9. A turbo refrigerator comprising:
a condenser that liquefies a compressed refrigerant;
an evaporator that by evaporating the refrigerant that has been liquefied by the condenser cools a cooling object; and
a turbo compressor that compresses the refrigerant that has been evaporated by the evaporator and supplies it to the condenser,
wherein the turbo refrigerator is provided with the turbo compressor according to claim 8 as the turbo compressor.

10. The liquid level indicator according to claim 2, wherein the liquid introduction tube has a sloping portion for guiding air bubbles introduced to the tube interior to the liquid level calm portion by their buoyancy.

11. The liquid level indicator according to claim 2, wherein the distal end portion is provided bent with respect to the extension portion toward the inner wall side of the liquid storage portion.

12. The liquid level indicator according to claim 3, wherein the distal end portion is provided bent with respect to the extension portion toward the inner wall side of the liquid storage portion.

13. The liquid level indicator according to claim 2, having a gas vent tube provided with a second extension portion that communicates with the gas vent and extends toward the top portion of the liquid storage portion, and a second distal end portion that communicates with the second extension portion and opens in a direction other than the upward direction above the liquid level.

14. The liquid level indicator according to claim 3, having a gas vent tube provided with a second extension portion that communicates with the gas vent and extends toward the top portion of the liquid storage portion, and a second distal end portion that communicates with the second extension portion and opens in a direction other than the upward direction above the liquid level.

15. The liquid level indicator according to claim 4, having a gas vent tube provided with a second extension portion that communicates with the gas vent and extends toward the top portion of the liquid storage portion, and a second distal end portion that communicates with the second extension portion and opens in a direction other than the upward direction above the liquid level.

16. The liquid level indicator according to claim 6, wherein the second distal end portion is provided bent with respect to the second extension portion toward the inner wall side of the liquid storage portion.

17. A turbo compressor that compresses a gas by rotating an impeller with an electric motor, comprising:
a gear unit that transmits the rotating force of the electric motor to the impeller; and
an oil tank below the gear unit that stores lubricating oil to be supplied to the gear unit,
wherein the turbo compressor is provided with the liquid level indicator according to claim 2 as a liquid level indicator that displays the liquid level of the oil tank.

18. A turbo compressor that compresses a gas by rotating an impeller with an electric motor, comprising:
a gear unit that transmits the rotating force of the electric motor to the impeller; and
an oil tank below the gear unit that stores lubricating oil to be supplied to the gear unit, wherein the turbo compressor is provided with the liquid level indicator according to claim 3 as a liquid level indicator that displays the liquid level of the oil tank.

19. A turbo compressor that compresses a gas by rotating an impeller with an electric motor, comprising:
a gear unit that transmits the rotating force of the electric motor to the impeller; and
an oil tank below the gear unit that stores lubricating oil to be supplied to the gear unit,
wherein the turbo compressor is provided with the liquid level indicator according to claim 4 as a liquid level indicator that displays the liquid level of the oil tank.

20. A turbo compressor that compresses a gas by rotating an impeller with an electric motor, comprising:
a gear unit that transmits the rotating force of the electric motor to the impeller; and
an oil tank below the gear unit that stores lubricating oil to be supplied to the gear unit,
wherein the turbo compressor is provided with the liquid level indicator according to claim 5 as a liquid level indicator that displays the liquid level of the oil tank.

21. The liquid level indicator according to claim 1, wherein a through opening that penetrates horizontally in the thickness direction is formed in the wall portion of the liquid storage portion, and
the liquid level calm portion is provided in the through opening.

* * * * *